US008780199B2

(12) United States Patent
Mimar

(10) Patent No.: US 8,780,199 B2
(45) Date of Patent: *Jul. 15, 2014

(54) NETWORKED SECURITY CAMERA WITH LOCAL STORAGE AND CONTINUOUS RECORDING LOOP

(76) Inventor: Tibet Mimar, Morgan Hill, CA (US)

( * ) Notice: Subject to any disclaimer, the term of this patent is extended or adjusted under 35 U.S.C. 154(b) by 366 days.

This patent is subject to a terminal disclaimer.

(21) Appl. No.: 12/586,355

(22) Filed: Sep. 20, 2009

(65) Prior Publication Data

US 2012/0307049 A1 Dec. 6, 2012

(51) Int. Cl.
*H04N 9/47* (2006.01)

(52) U.S. Cl.
USPC ........ 348/143; 348/148; 348/151; 348/208.1; 348/208.3; 348/211.8

(58) Field of Classification Search
USPC ......... 348/143, 151, 153, 208.1, 208.3, 211.8
See application file for complete search history.

(56) References Cited

U.S. PATENT DOCUMENTS

| | | | | |
|---|---|---|---|---|
| 6,333,759 | B1 | 12/2001 | Mazzilli | |
| 7,228,429 | B2 | 6/2007 | Monroe | |
| 7,319,485 | B2 | 1/2008 | Szolyga et al. | |
| 2003/0156192 | A1 | 8/2003 | Cho | |
| 2006/0209187 | A1 | 9/2006 | Farneman | |
| 2008/0020354 | A1* | 1/2008 | Goree et al. | 434/11 |
| 2008/0190639 | A1* | 8/2008 | Baran et al. | 174/50 |
| 2009/0207301 | A1* | 8/2009 | Fransson | 348/371 |
| 2009/0278945 | A1* | 11/2009 | Lin | 348/208.1 |
| 2010/0139290 | A1* | 6/2010 | Leblond | 62/3.3 |

OTHER PUBLICATIONS

Wireless-G Internet Home Monitoring Camera, Cisco, Model: WVC54GCA, pp. 1-2, California, USA, Jul. 2004.
QSD9004 User Manual, Q-See, p. 1-40,Feb. 2009, California, USA.

* cited by examiner

*Primary Examiner* — Yves Dalencourt

(57) ABSTRACT

A networked surveillance audio-video recorder for security applications with local storage and continuous record loop using high-definition video and encrypted data is described. Evidentiary audio-video is locally stored on a non-volatile storage media, and later transmitted in accordance with channel bandwidth with optional temporal, spatial or peak signal-to-noise ratio (PSNR) scalability and in accordance to display capabilities of target viewing device upon request of time regions of interest or window around alarm trigger events, or for periodic archival reasons.

14 Claims, 11 Drawing Sheets

Prior Art Fig. 1

Prior Art Fig. 2

NETWORKED SECURITY CAMERA WITH LOCAL STORAGE AND CONTINUOUS RECORDING LOOP

BACKGROUND OF THE INVENTION

1. Field of the Invention

The invention relates generally to the field of security and specifically to the field of audio-video security recording for security purposes. More particularly, the present invention relates to performing audio and video compression and storing data in a local storage that is networked.

2. Description of the Background Art

Existing security systems for homes and commercial properties feature multiple video camera connected to a security box as shown in FIG. 1. The security box contains electronics to convert analog video and optional audio inputs to digital and performs audio and video compression by a System-On-Chip (SoC) processor, which then stores the results on a hard disk. The system could be programmed for continuous recording in a loop, recording upon a trigger caused by external alarm and scene change threshold, or timed scheduled recording. The cameras are connected by cabling and video is transmitted as analog to the main system. Such cabling makes it difficult to install the multiple camera inside and outside a residence or commercial because of routing of such long cabling between a user accessible box and cameras. Such a system provides 240 frames-per-second capture, which is divided by multiple cameras. For a 8-camera system, each camera video is captured at 240/8, or 30 fps, but capture resolution is usually low at CIF resolution (350×240). Such a security box can display captured video live from cameras or from hard disk on a monitor or TV, and user functions are controlled by front-panel buttons or an infrared remote-control unit (RCU). This means such a security box must be located near a TV and be visible for RCU operation. Such a system also provides means for remote viewing over internet, and can also send email messages with some snap shots of video when a alarm trigger occurs. However, there are many vulnerabilities in such a system. If internet is not working at the time of intrusion because phone or internet cables are externally cut, then no such email could be send. Thief can easily remove or damage the whole security box which removes all security data.

Another existing video security systems use networked security based where multiple camera units are connected to a PC or laptop computer over local area network or wide-area network, as shown in FIG. 2. For example, 9 wireless camera units can connect to a PC computer using Ethernet wires or 802.11 wireless communication. Each camera unit contains video camera, video compression, and network interface in this case. Existing systems use JPEG or MPEG-2 or MPEG-4 systems, but in the future this will probably extend to advanced H.264 video compression standard as well in new designs. If there is no local computer, it is also possible to connect the cameras to a router connected to a WAN gateway, so that multiple security video channels could be streamed to a remote PC or laptop. The remote PC or laptop could perform remote viewing or recording of one or multiple channels on its hard disk storage. One of the disadvantage of such a security system is that if internet access deliberately interrupted at the time of a security event, then it is not possible to stream the data for the event to the remote PC for recording. If the PC is located locally, then it could easily be removed by the perpetrators. Furthermore, such a system requires continuous stream of multiple video streams over local and wide area networks, which places a considerably load on such networks, thus causing unreliable operations and slowing other network activity. Cabled systems using Ethernet cabling also require difficult cabling of multiple camera units. Units configured to use 802.11 g systems contend bandwidth collisions with other systems, cordless phone, wireless microwaves, and other wireless communication systems on a limited number of channels. Thus, it becomes difficult and unreliable to transfer plurality of live compressed video stream in real-time without interruptions.

SUMMARY OF PRESENT INVENTION

The present invention provides a networked surveillance audio-video recorder system for security applications with local storage and continuous record loop. The present invention does not require continuous streaming of plurality of audio-video surveillance channel to a central unit, and does not depend on a working network or phone interface at the time of a trigger or intrusion occurrence. Evidentiary audio-video is locally stored on a non-volatile storage media, and later streamed in real-time upon request of time regions of interest or window around trigger events, or for periodic archival reasons. The present invention does not depend on a local central storage from multiple camera unit that could be easily removed by an intruder. Advanced H.264 video compression is used for video compression and for improved video quality and reduced storage requirements. Video is stored at HD resolution, but transmitted for a given region of interest to a remote location in requested resolution and video rate.

BRIEF DESCRIPTION OF DRAWINGS

The accompanying drawings, which are incorporated and form a part of this specification, illustrate prior art and embodiments of the invention, and together with the description, serve to explain the principles of the invention.

DETAILED DESCRIPTION

In today's world, there is a strong need for video security systems that are easy to install, to perform continuous video recording, and storage of security video without depending upon external or local network or phone connections at the time of an emergency, and without the risk of stored video data being removed by perpetrators. In today's technology powerful System-on-Chip (SoC) contain all system functions in a programmable manner on a single chip that is smaller than a half inch on each side, yet being able to process complex audio and video processing tasks, and system interfaces, network interfaces, etc all on a single chip. Such SoCs are beginning to compete with PC processors by performing and providing multiple processors and multiple hardware accelerators on a single chip, but at much lower cost, size and power consumption points. At the same time, the emergence of advanced video processing techniques and advanced video compression standards such as H.264 enable high-quality compressed video streams at a 3-4× reduced bit stream rates. These capabilities provide means for advanced processing and storage at each security node without having to stream multiple streams of low quality data at each camera site. The present invention uses a System-on-Chip (SoC) connected to a removable non-volatile semiconductor storage such as USB memory key to continuously record audio and video in a forever loop on said USB memory key or other type of Flash non-volatile memory, where each loop is completed in multiple days or more in accordance to size of USB memory key used. This is different than existing security systems because video is recorded in high quality of standard definition (640×480) with image sensor, image processing and storage of surveillance data collocated at the camera site without having to stream data continuously over cabling or wireless in real-time. Also advanced image processing, and video compression is used for high-quality video image up to 720P HD resolution in comparison to today's CIF resolution security cameras at less than 30 fps resolution using MPEG-2, MPEG-4.2, or motion JPEG with lower quality. If there is security event, past audio-video data for the last couple of days could be examined. Since the present invention does not use a hard disk, and just a small USB memory key is used in one embodiment in conjunction with advanced H.264 video compression, physically a very small audio-video monitoring security module could be easily placed discreetly in multiple places without attracting attention and require only external power in some embodiments. The lack of central storage prevents the central storage unit being stolen, and a dummy central storage unit could be optionally used to provide the appearance of damaged or removed evidence of stored video surveillance data.

Figure 1:
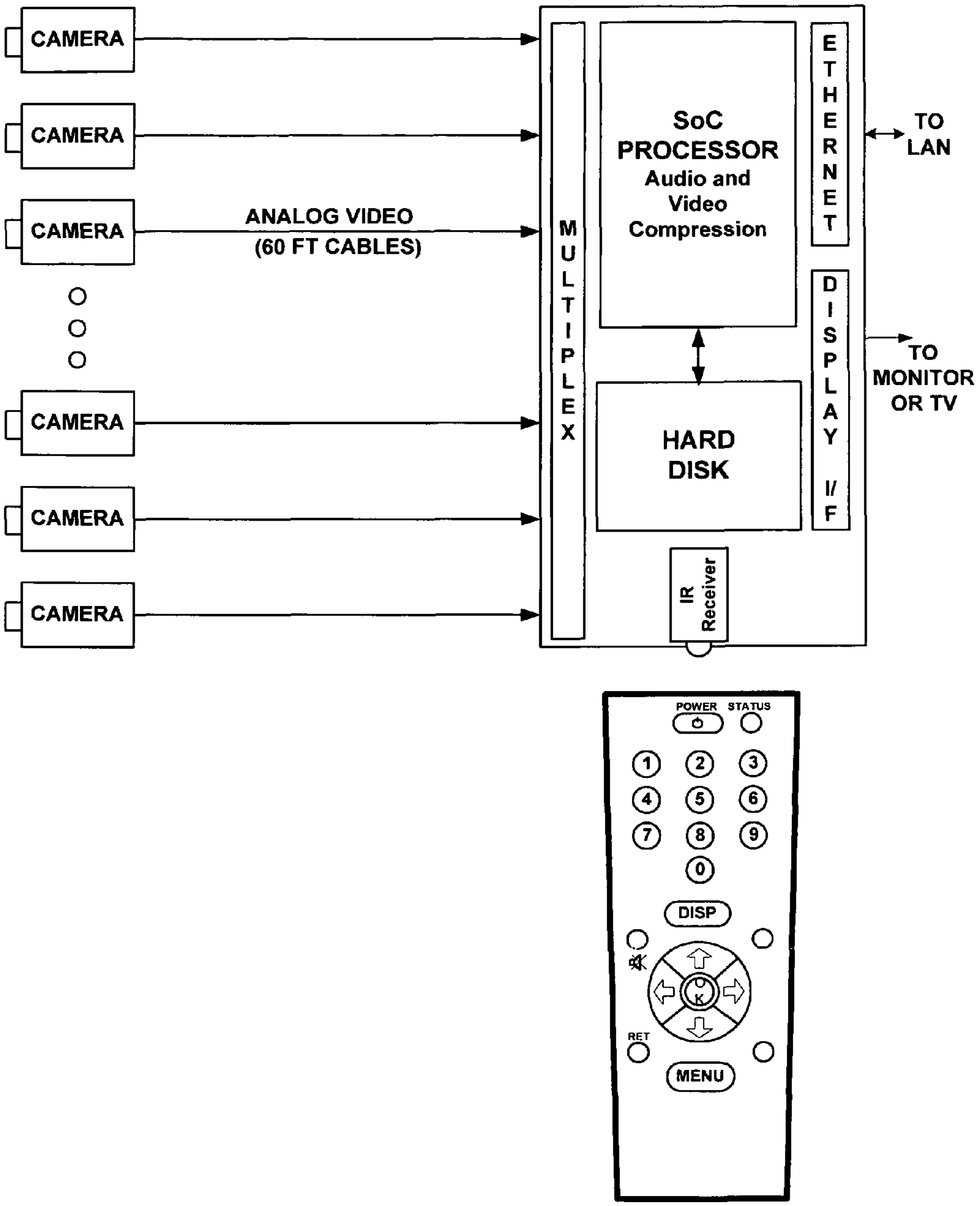
FIG. 1 shows detailed block diagram of a first prior art security system.
Figure 2:
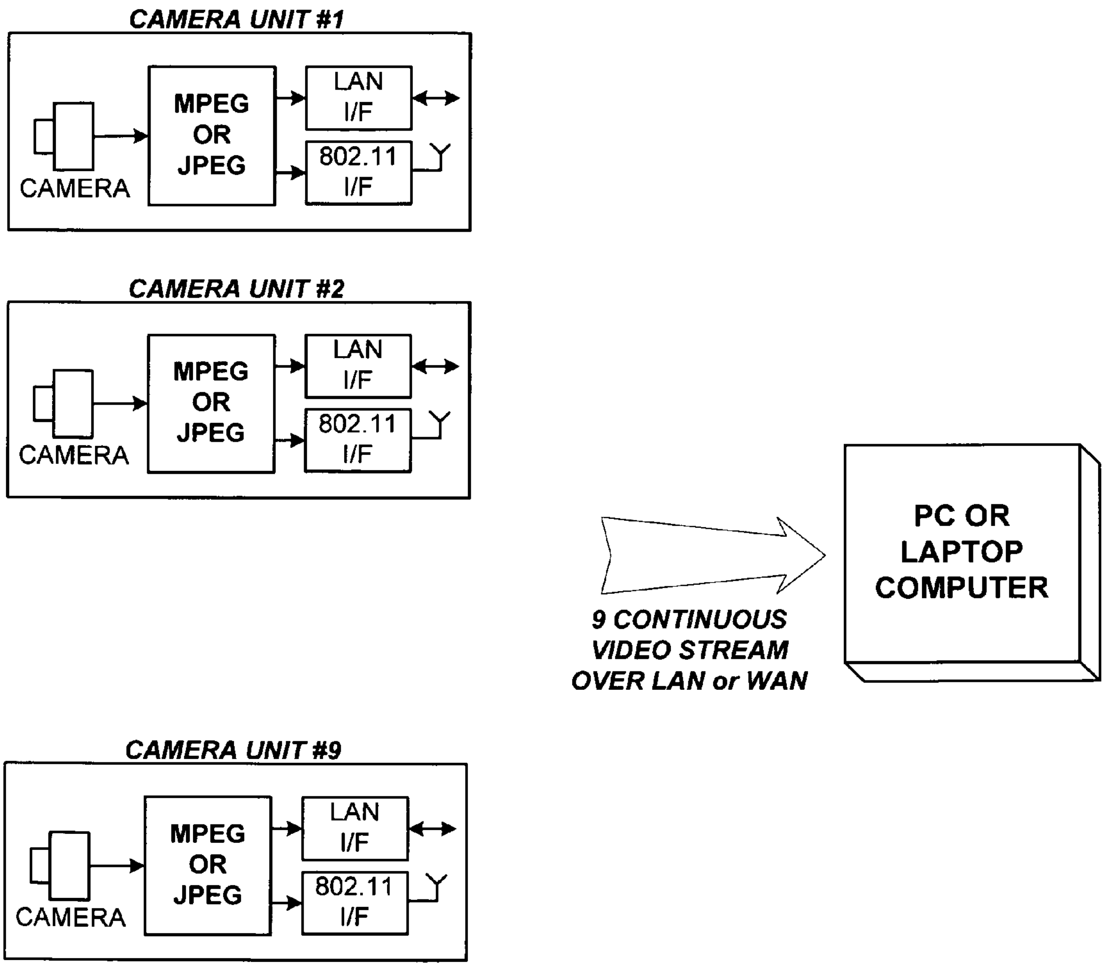
FIG. 2 shows block diagram of a prior art of a second prior art security system.
Figure 3:
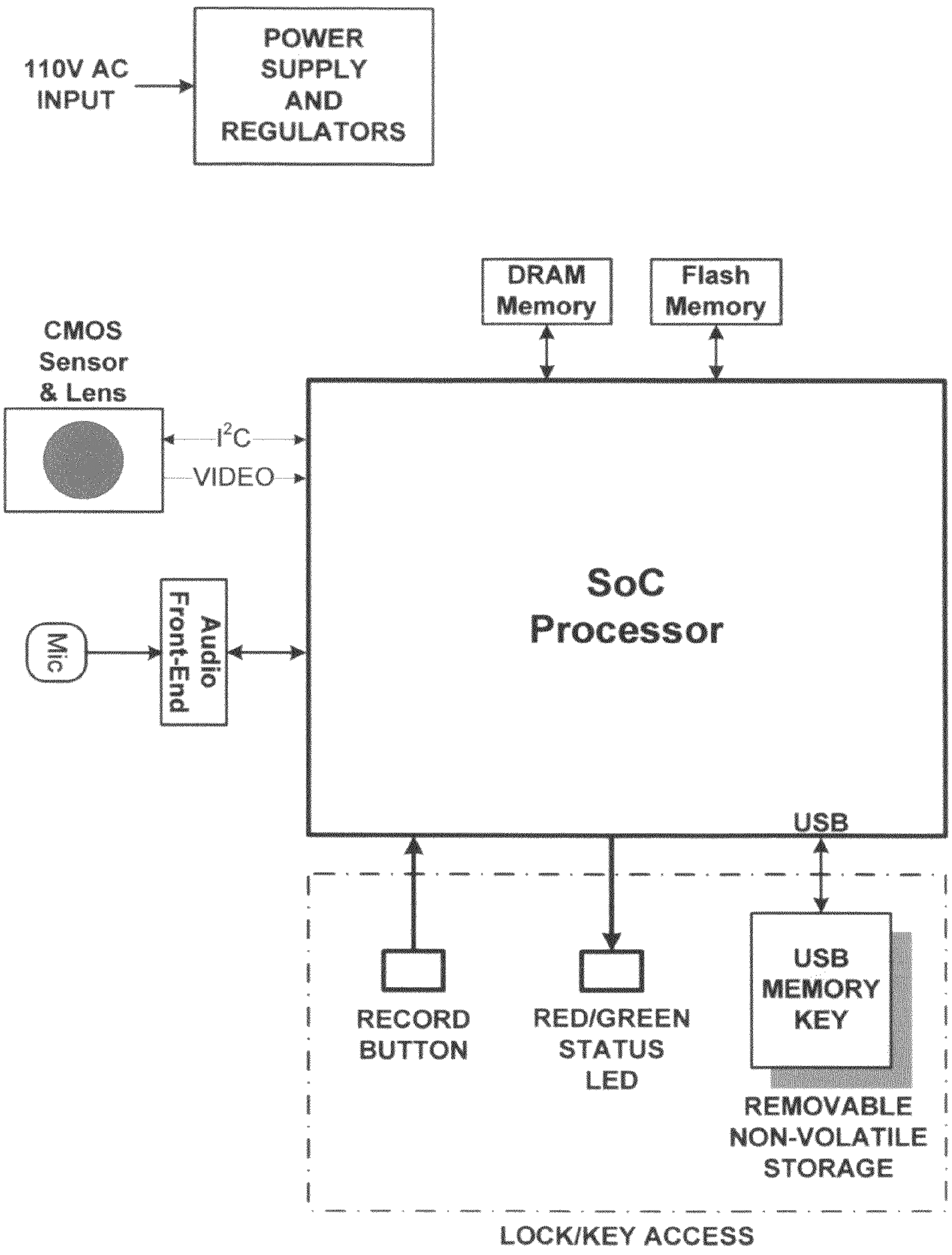
FIG. 3 shows block diagram of one embodiment of present invention.

In one embodiment shown in FIG. 3, the only connection required is the power connection to a 110V AC, and such a small security module could be directly plugged in a power outlet, or mounted near a light fixture to receive power. The small memory key, record button, and status indicator is placed under a small keyed cover to prevent stopping or removing the USB memory key by an unauthorized access. In this embodiment, USB memory key can be removed and plugged in a PC or laptop for accessing the stored video loop. Optionally, the stored data on USB memory key can be encrypted so that only people with security key can access the stored surveillance video and audio data.

Figure 4:
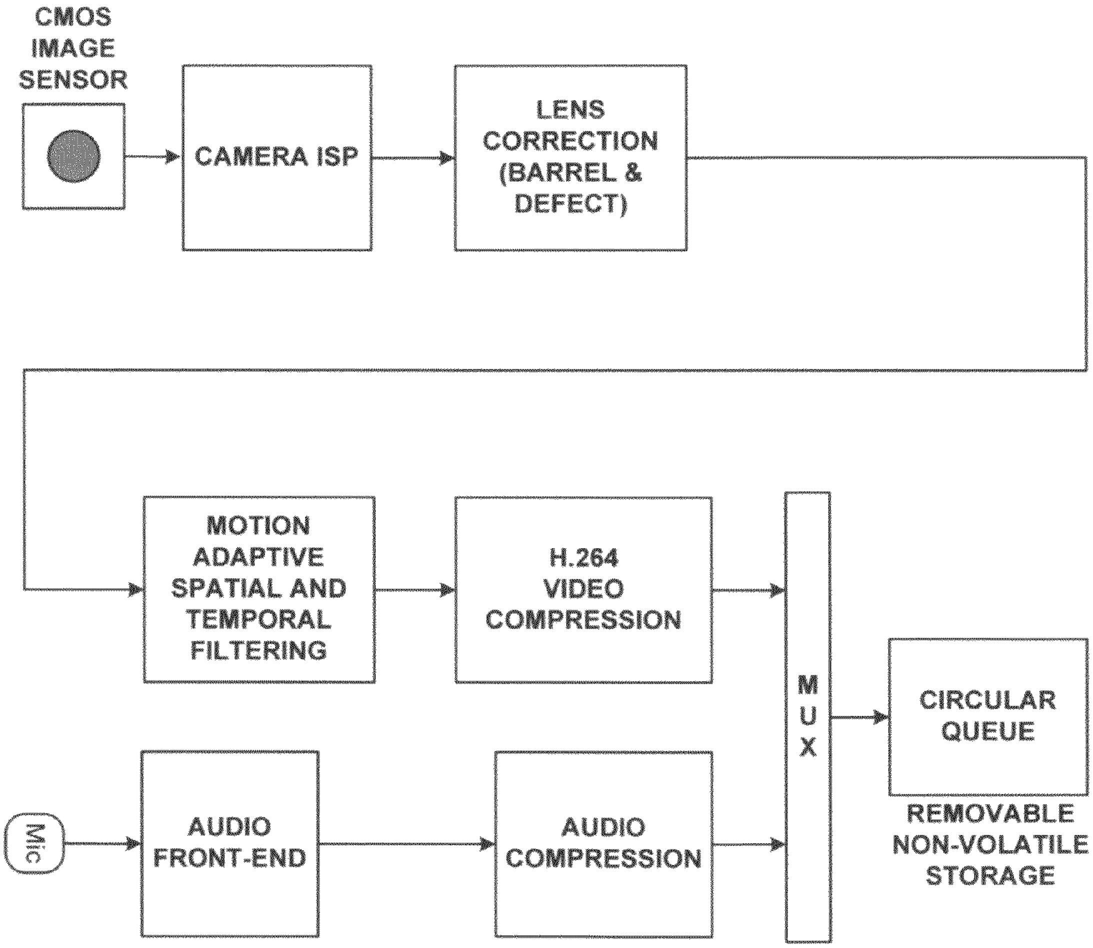
FIG. 4 shows block diagram of data flow and processing in present invention.

FIG. 4 shows that CMOS image sensor interfaced to a camera Image Signal Processing (ISP) function as part of the camera module or the SoC. ISP performs auto white balance, auto-gain, Bayer conversion, lens defect correction, etc. Since images from a CMOS sensor does not have issues of interlaced video input, the resultant video is much higher quality, and resolution up to and including 720P could easily be obtained.

Using wide-angle lenses causes a barrel effect. Such lens defects are removed in real-time by front-end processing. Motion adaptive spatial filtering compares each pixel of a given frame with same pixel from the last frame of video, and filtered new video frame and unfiltered video frame are combined with weights of x and (1-x), respectively, in accordance with difference said current and last frame pixel values. This has the effect of filtering high motion areas, since human visual system are less sensitive to noticing the resolution of such areas. Motion adaptive temporal reduces the video noise when there is no motion without reducing the video resolution. Two or more video frames are averaged on a pixel-by-pixel basis, in other words depending on the region of a video frame, in accordance with a IIR filter to reduce temporal noise. The resultant effect of motion adaptive spatial and temporal filtering prior to video compression is to significantly further increase the video compression and/or increase video quality.

Figure 5:
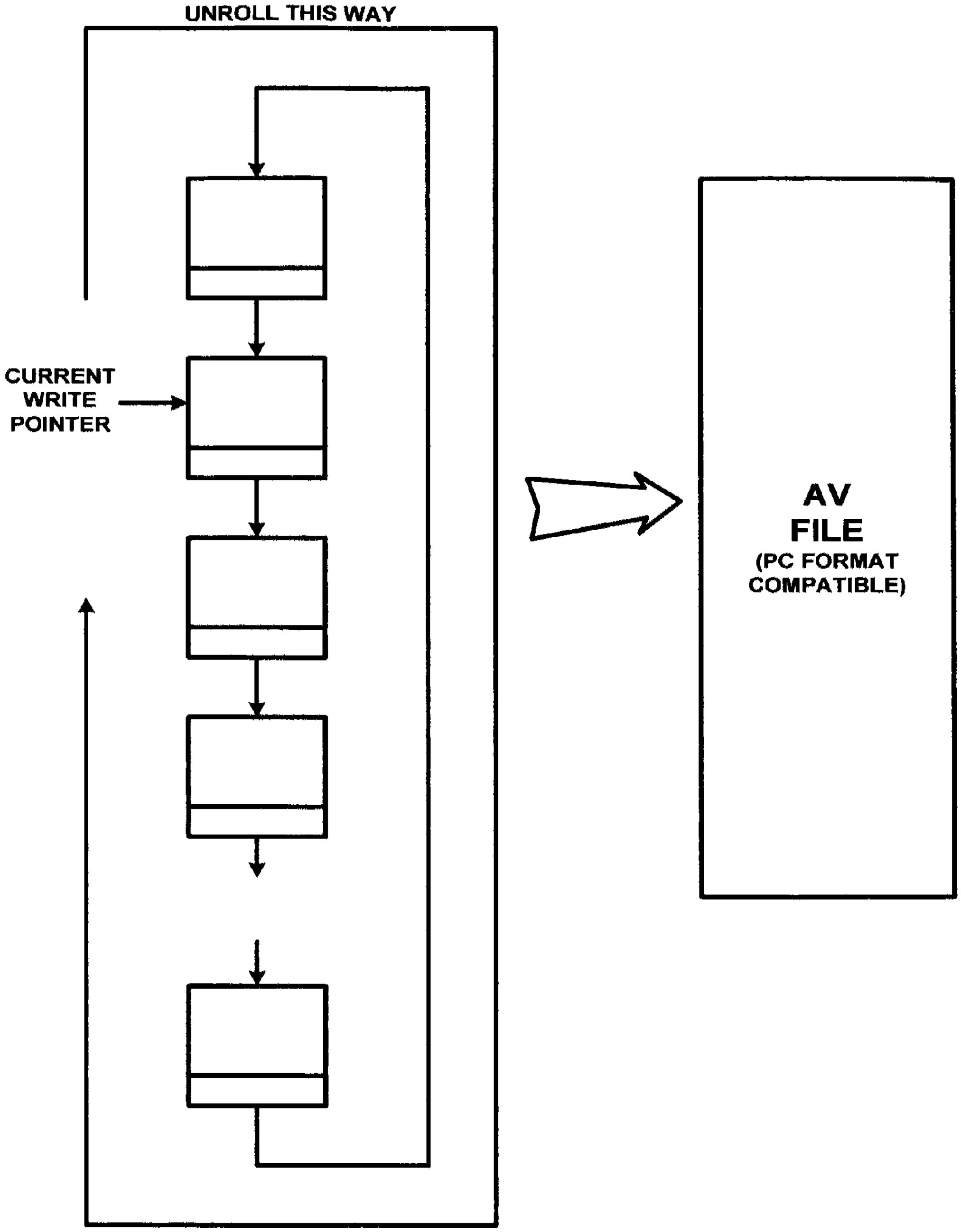
FIG. 5 shows circular queue for continuous recording loop of audio and video.

The output of motion adaptive spatial and temporal filter is compressed using the advanced video compression standard H.264. H.264 provides high video quality and at the same time reduces the amount of data that is necessary to store by a factor of 3-4 in relative to MPEG-2 standard. This allows storage of data on a USB memory key at high quality without requiring the use of hard disk storage. Hard disk storage used by existing systems increases cost and physical size. SoC also performs audio compression, and multiplexes the compressed audio and video together. The multiplex compressed audio-video is stored on part of USB memory key in a continuous loop as shown in FIG. 5. At a typical 500 Kbits/sec at the output of multiplexer for standard definition video at 30 frames-per-second, we have 5.5 Gigabytes of storage required per day of storage. Using a 16 Gigabyte USB memory key could store about three days of storage, and 64 Gigabyte USB memory key can store about 11 days of storage.

Since the compressed audio-video data is stored in a circular queue with a linked list pointed by a write pointed as shown in FIG. 5, the circular queue has to be unrolled and put in a file format recognizable as one of commonly used PC audio-video file formats. This could be done, when recording is stopped by pressing the record key by doing post processing by the SoC prior to removal of USB key. Such a conversion could be done quickly and during this time status indicator LED could flash indicating wait is necessary before USB memory key removal. Alternatively, this step could be performed on a PC, but this would require installing a program for this function on the PC first.

Figure 6:
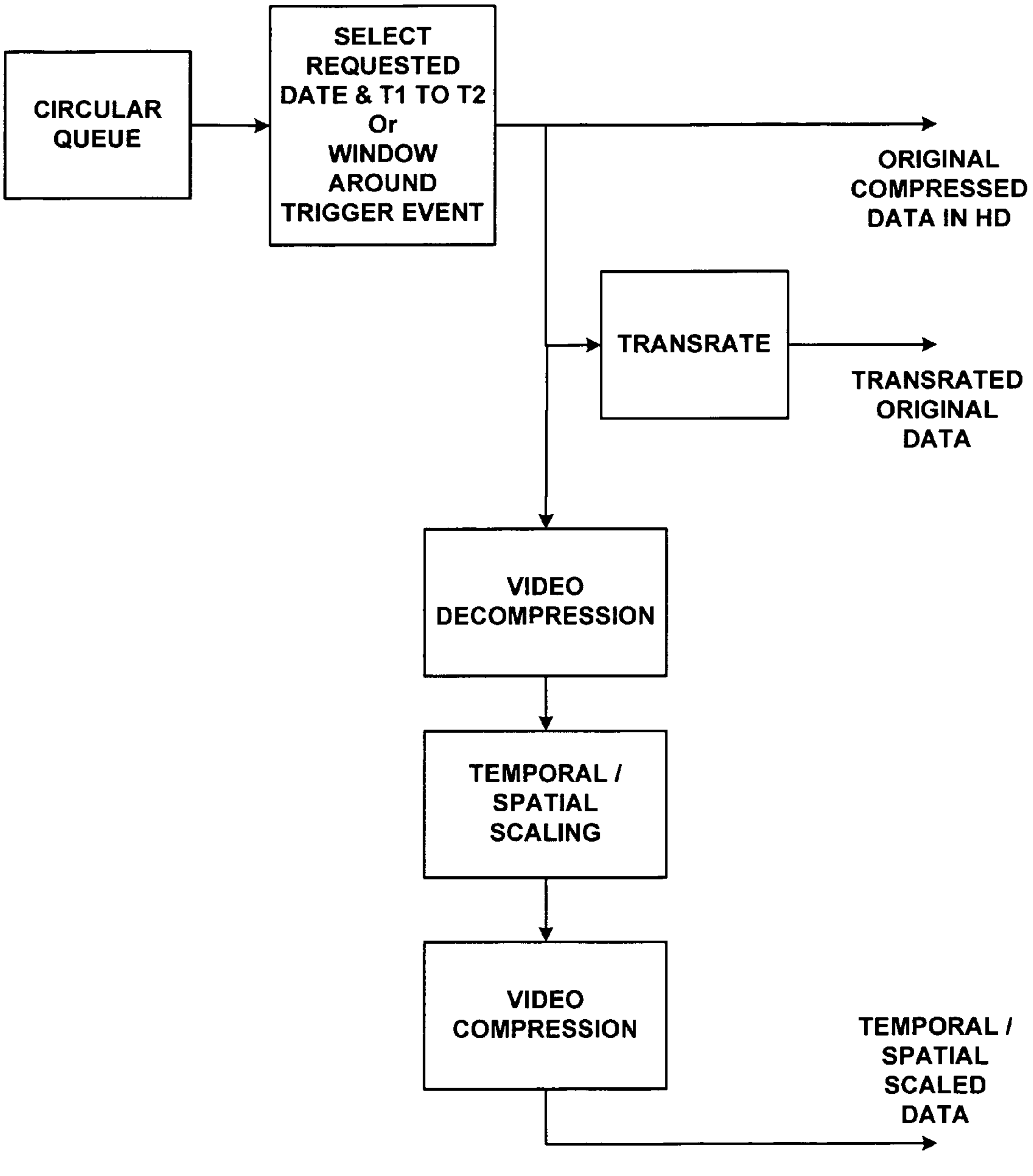
FIG. 6 shows block diagram of possible options for sending video surveillance data to a remote monitoring site.

In networked embodiment of the present invention, remote site could request data for a given date and from time T1 to time T2. Such requested data could be sent directly from compressed data in circular queue, as shown in FIG. 6. Alternatively, stored data could be transrated to match the capabilities of network channel and/or the destination display device. For example, if the data is to be sent over a 3G or 4G network to a remote personal media player at SD resolution, but recorded data is at 720P resolution, this requires either transrating or temporal or spatial scaling. Transrating requires partial decode of the desired region up to quantization step and changing quantization and performing variable length encode again with the new quantization factor.

The original data is stored as a variable bit rate (VBR) in the circular queue since there is no limitation for bit rate peaks for local storage, but this could be changed to constant bit rate (CBR) stream by the transrating for transmitting over a low bandwidth network channel with no ability to handle peak rates of VBR.

The requested data could also be sent in a data file format without the need to real-time streaming since it is already stored in local storage of the camera module. Thus, there is no requirement to stream it in real-time. Transmitting the requested window of data as a data file provides a convenient means to get the data by a remote site over a low bandwidth or unreliable network channel. The data could be sent with TCP/IP so that any errors are recovered by re-request of those portions.

In contrast, prior art systems with multiple camera systems have to stream multiple channels of data which cannot be reliably accomplished due to high-demand of multiple video streams over a local area wireless network. If only one stream from one selected camera is streamed, then data from other cameras are permanently lost. If the cameras are wired, there is still the problem of streaming multiple channels due to limited uplink rate of internet accesses. Again, either all data is stored in a central location which is subject to removal, or some channels of data is permanently lost.

Figure 7:
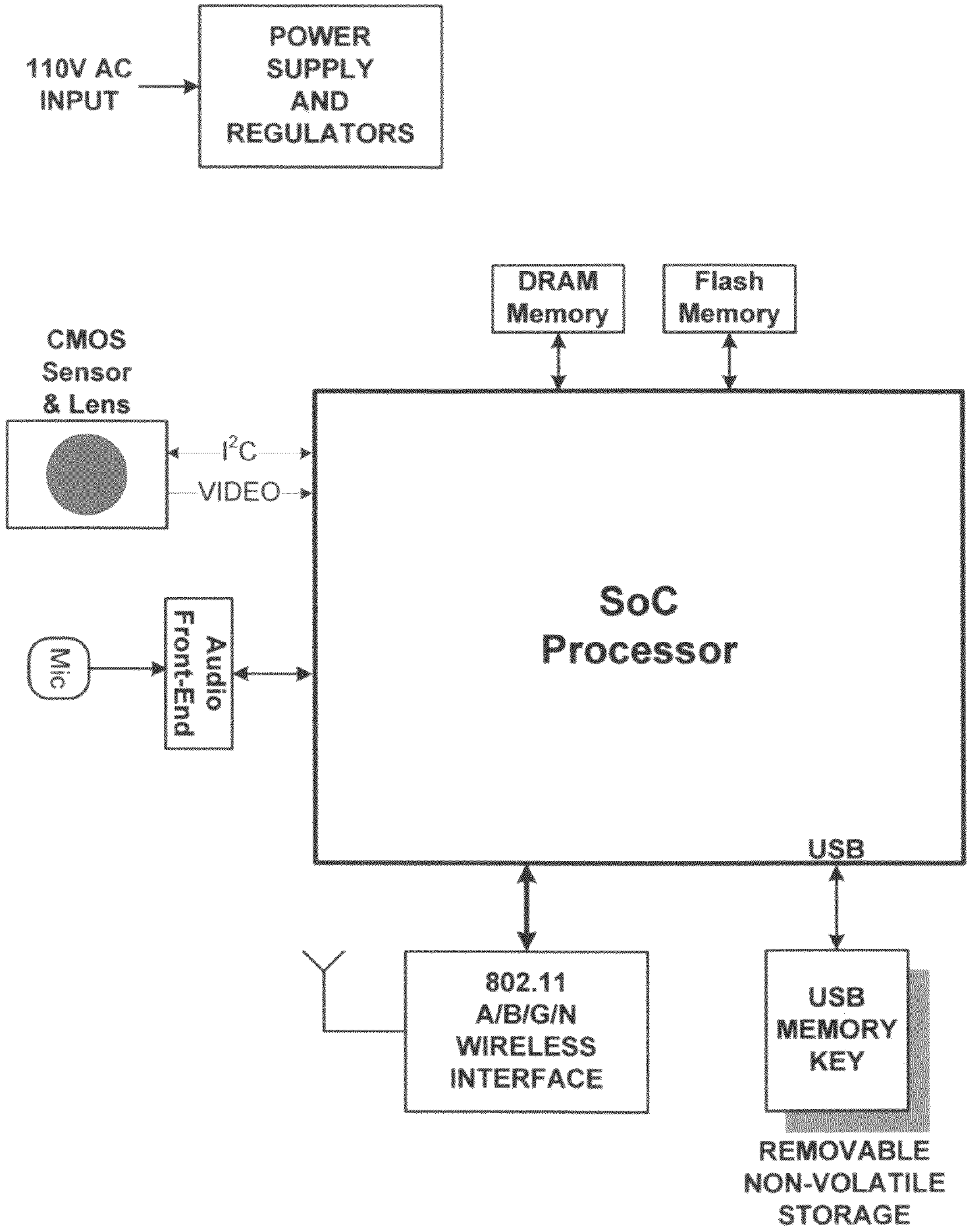
FIG. 7 shows block diagram of second embodiment of present invention using wireless networking.
Figure 8:
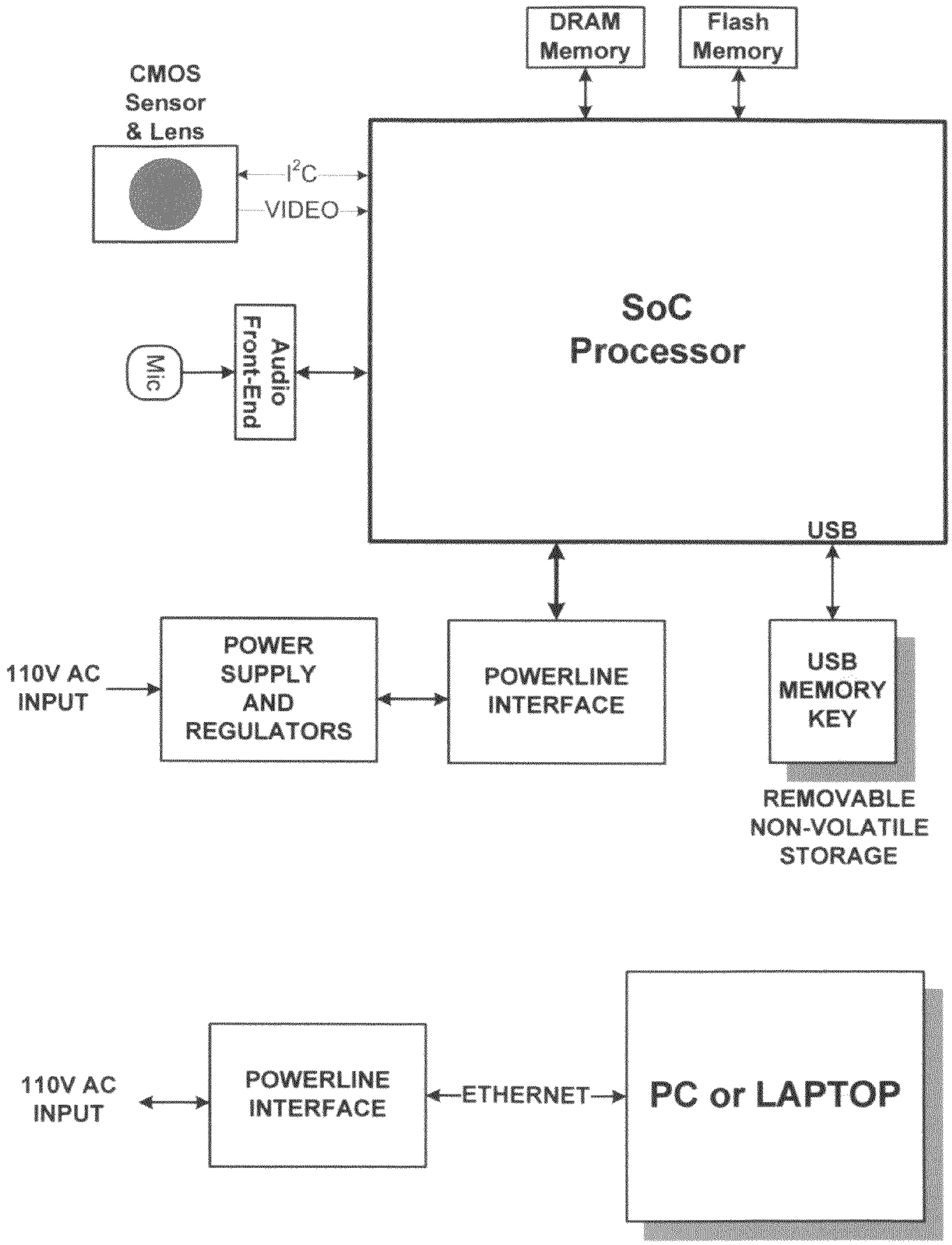
FIG. 8 shows block diagram of third embodiment of present invention using power line networking.

FIG. 7 shows an embodiment where removing the USB memory key is not necessary, and access to past surveillance data is transferred using a 802.11 a/b/g/n wireless standard interface that is built in to the camera interface. In this case, the audio-video data is not continuously streamed over wireless interface, but it is continuously stored onto local embedded USB memory key. A remote user can connect to a given camera module of present invention and request transfer of surveillance data starting from a time T1 to time T2 on a specified date which is within the window of continuous loop of recording. Such requested data is transferred while at the same time continuing to record. The data transfer in this case does not have to be in real-time because the source data is already stored, and thus it could be done over networks with less bandwidth than the recording bandwidth of camera module. The following remote commands could be executed by the camera module:

Status: Provides current status: recording, stopped, start of times motion detected, etc.

Mode: Resolution requested or layer of PSNR scalable data to be sent for desired range.

Record: Start recording mode;

Stop: Stop recording;

Stream Video Clip: Sends from T1 to T2 for a specific date. This could be done in real-time, or as a file-transfer in non-real-time depending upon the connection and available bandwidth.

The local storage of surveillance data and the ability to transrating the stored data by the SoC of present invention provides the capability of transmitting regions of interest of previously recorded audio-video data with temporal or spatial scalability in accordance to available network channel bandwidth and/or target device display capability. For example, if the target device requesting data is a mobile networked personal media player (or cell phone with such display capability), then compressed video data is partially decompressed and then compressed again at the display resolution (referred to as transrating). The present invention also provides ability to temporarily scale compressed data for remote fast forward and search capability, and once a desired region of interest is located, then higher resolution video of the same could be requested by the central device. The central device could be monitoring station or a cell phone with video playback capabilities and could be physically located on the premises or anywhere else with Internet or phone access. The present invention does not depend on network to stream the data in real-time, since captured data is already stored in high-resolution on local storage at the camera location as part of the camera module. Transrating helps matching the destination device and channel bandwidth capabilities, but data could also be transmitted in non-real-time, and displayed after transfer.

Present invention also provides for data for a desired window to be sent with PSNR or temporal scalability so that first a quick search could be performed for the region around an time of interest such as a alarm trigger point, and fast forward type search could be done. Then, as a second step a higher resolution version, or further layers of PSNR scalable resolution could be requested around the region of interest.

The present invention provides scalable video quality since video data could be captured at HD (based on a setup command remotely), and then scaled spatially and transrated at the time of transmit request in accordance with channel and destination capabilities.

The audio-video that is streamed upon request is encrypted using 802.11 WEP or other method to prevent viewing by other people, and it is not normally streamed all the time, there is more security against unauthorized access of security video externally.

Since the surveillance data is stored locally in a small unsuspecting and hard to notice physical module, there is significantly less risk of removal of such storage information as in the case of central video surveillance that is accessible and removable of prior art systems.

Another embodiment of present invention uses power line interface to transfer the surveillance data upon request by a local or remote PC, as shown in FIG. 7. There are several power line interface standards such as HomePlug AV which transfers data over existing power lines without requiring additional cabling. In this case, the power supply connection is used to communicate one or more camera modules to a power line module connected to a router that is connected to a local PC or internet. As in the 802.11 interface, commands could be issued over the power line interface to control each camera module and to access certain audio-video clips as desired within the time window of past cyclic storage, and video data is only streamed when requested.

Another embodiment of present invention uses a solar cell and rechargeable battery, and a 3G or 4G data wireless transfer interface. This embodiment requires no cabling. Application of this is not only residences, and commercial properties, but also traffic light and street corners, and other public places. Instead of cabling multiple cameras and having to look at plurality of incoming video streams in a video monitoring room, only certain cameras are watched, and previously recorded portions of surveillance could be transferred upon request. Furthermore, since processing is done at the camera module, it is easy to add video facial recognition for certain list of individuals in public places for certain action to be signaled.

Figure 9:
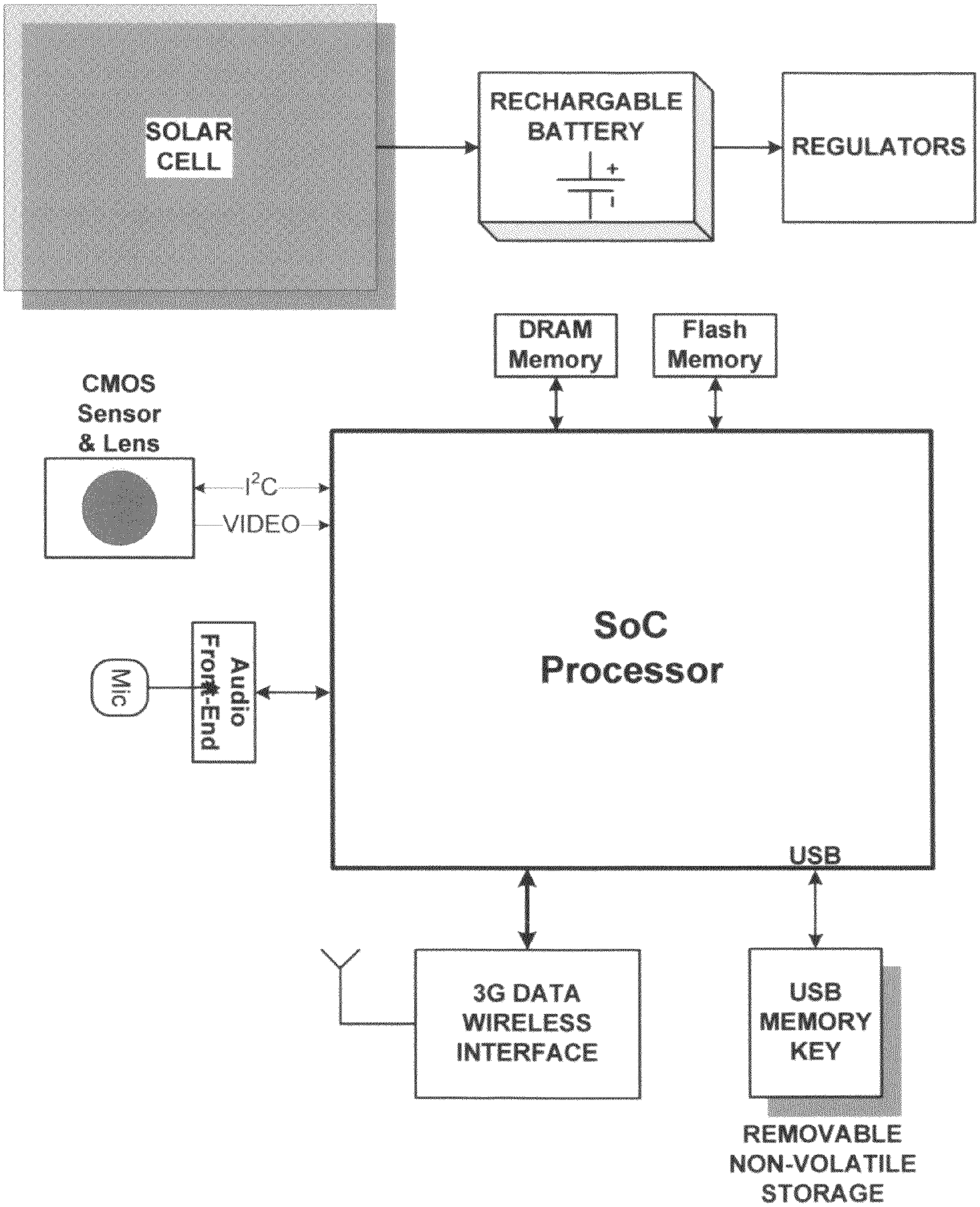
FIG. 9 shows block diagram of third embodiment of present invention using solar cell for charging embedded rechargeable battery and 3G or 4G wireless modem for networking.
Figure 10:
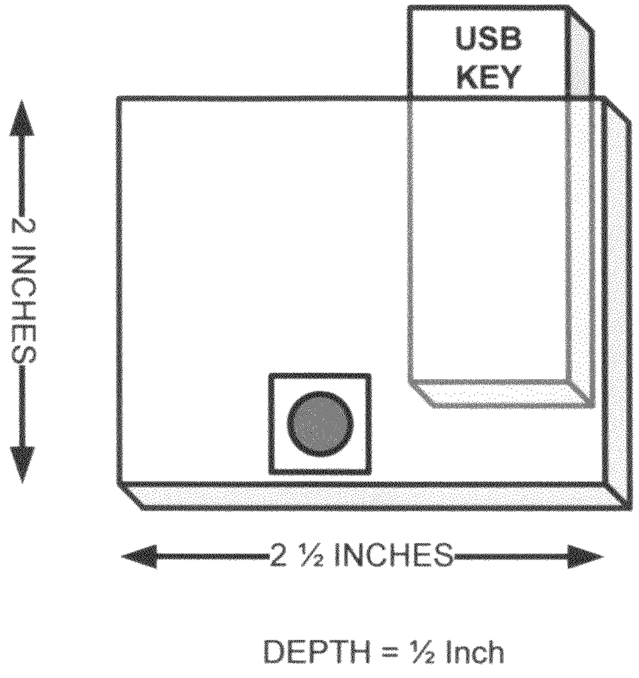
FIG. 10 shows illustration of audio-video security module physical characteristics in one embodiment.
Figure 11:
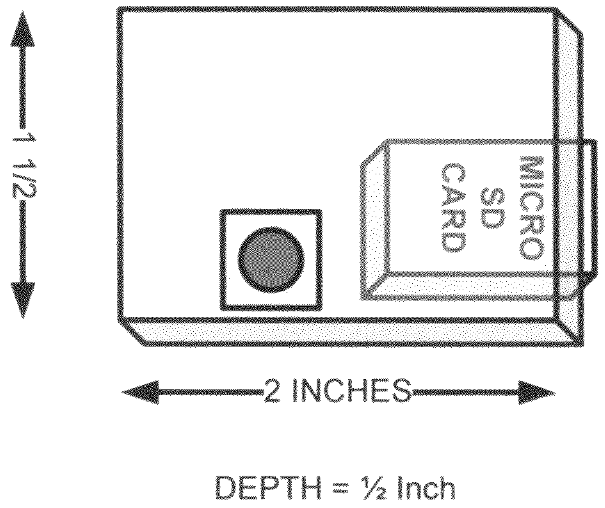
FIG. 11 shows illustration of audio-video security module physical characteristics in an embodiment using micro SD card for local storage of surveillance recording in a continuous loop.

FIG. 9 shows the physical size of present invention in one embodiment using a USB memory key. The BOM cost of such a system is less than $50, thus such a system could be sold at about $99, and be deployed widely at public places, commercial and residential applications. FIG. 10 shows a physical size of present invention using micro SD card for storage.

I claim:

1. An apparatus for video surveillance system, the apparatus comprising:

at least one camera sensor, said at least one camera sensor is configured to capture 30 frames-per-second at a minimum of high definition resolution;

at least one image signal processor coupled to said at least one camera sensor for performing image signal processing functions including but not limited to auto white balance, auto gain, wide-angle lens barrel distortion reduction, and lens defect compensation;

a motion adaptive spatial and temporal filtering unit that is coupled to output of said at least one image signal processor for preprocessing of video data;

at least one video compression unit according to H.264 standard that is coupled to output of said motion adaptive spatial and temporal filtering unit, said at least one video compression unit is configured to compress 30 frames-per-second at a minimum of high definition resolution in variable bit rate;

a processor coupled to at least one video compression unit to store compressed data on a removable non-volatile semiconductor storage media in a continuous record loop in a circular queue, said circular queue is configured for storing multiple days of storage of surveillance data, in accordance with size of said removable non-volatile semiconductor storage media, before oldest data is overwritten by newly recorded video;

an encryption unit coupled to said processor, wherein said stored compressed data on said removable non-volatile semiconductor storage media is configured to be encrypted to allow only people with a security key to access said stored surveillance data;

an internet interface unit coupled to said processor using an interface including but not limited to 802.11 wireless interface, 3G data interface, 4G data interface, or a power-line data interface;

a transrating unit coupled to said removable non-volatile semiconductor storage media using said Internet interface unit for transmitting said stored surveillance data at a different constant bit rate (CBR) in accordance with transmit channel and destination capabilities;

wherein said surveillance data from said circular queue for a time of interest from a start time to an end time is sent by said processor upon request by a remote device communicating to said Internet interface unit using a H.264 compressed and encrypted audio-video data file format;

wherein, in case of a trigger event, data enveloping said trigger event is saved and transrated into a lower constant bit rate before encryption and transmittal to one or more predefined internet destinations;

wherein, upon request to transmit a time range of said start time to a stop time, requested data is transmitted in a data file format in non-real-time using TCP/IP protocol, said data file is generated by decompressing video, performing temporal and spatial scaling, and compressing video at a different data rate in accordance with request and capabilities of a receiving device;

wherein all elements of the apparatus are integrated into a single compact unit:

whereby the apparatus is configured to save evidentiary data locally in said removable non-volatile storage media;

whereby an intruder is prevented from removing said evidentiary data that is captured and stored on multiple distributed units of the apparatus which are hard to reach or remove; and image processing and storage of surveillance data collocated at the apparatus without having to stream data continuously over cabling or wireless in real-time, thereby power consumption and local bandwidth of transmitted data are significantly reduced because continuous streaming of data is not required; only said data enveloping said trigger event or a requested time zone is transmitted upon request by said remote device.

2. The apparatus according to claim 1, further comprising:

a microphone, an audio preamplifier, an audio-to-digital conversion circuit, and an audio compression unit; and a multiplexer to combine output of said audio compression unit and said at least one video compression unit.

3. The apparatus according to claim 1, wherein said removable non-volatile semiconductor storage media uses flash memory including but not limited to a USB memory key, a SDHC memory card, a micro SD card.

4. The apparatus according to claim 1, further including a rechargeable battery to power the apparatus, and a solar cell to recharge said rechargeable battery.

5. The apparatus according to claim 1, wherein said internet interface unit uses HomePlug AV standard using power lines to connect to a local or remote device for transmission of data when requested.

6. An apparatus for security and evidentiary recording, the apparatus comprising:

a camera image sensor with at least high definition resolution for capturing video at 30 frames per second;

an audio microphone;

a removable flash memory including but not limited to USB memory key, SD memory card, or micro SD memory card;

a rechargeable battery;

a system-on-a-chip processor coupled to said removable flash memory and said camera image sensor, said system-on-a-chip processor comprising:

a camera ISP;

a hardware unit for lens barrel distortion reduction and lens defect compensation;

a first hardware accelerator module for motion adaptive spatial and temporal filtering;

a second hardware video accelerator unit for H.264 video compression at 30 frames-per-second with variable bit rate (VBR);

a hardware accelerator for transrating a VBR stream to a different bit rate CBR stream in accordance with available network channel bandwidth and target device display capability;

a security processor for encryption or decryption of locally stored and transmitted data;

a processor unit for audio compression;

an audio and video multiplexing circuit;

wherein compressed, encrypted and multiplexed audio-video surveillance data are stored on said removable flash memory using a circular queue, said circular queue is configured for storing at least several days of recording;

wherein a time range from a start time to a stop time of surveillance data is transmitted to a remote device upon request by said remote device or upon occurrence of a trigger event;

an Internet interface coupled to said system-on-a-chip processor including but not limited to 802.11 wireless interface, 3G wireless data interface, 4G wireless interface, and a power-line networking interface, said internet-interface is active only for sending data for said start time to said stop time upon request by said remote device and for signaling a trigger event to said remote device;

wherein, upon request to transmit said time range of said start time to said stop time, requested data is transmitted in a data file format in non-real-time using TCP/IP protocol, said data file is generated by decompressing video, performing temporal and spatial scaling, and compressing video at a different data rate in accordance with request and capabilities of a receiving device;

wherein said trigger event including but not limited to motion detection, causes copying data enveloping said trigger event to a separate file in said removable flash memory, and sending said copied data as an attachment to a predefined email address;

wherein all elements of said apparatus are tightly packed in a single small enclosure; and whereby one or more units of the apparatus concurrently capture video surveillance data continuously and store said video surveillance data locally for at least several days of past history and ensure that all evidentiary data are captured and analyzed when occurrence of an event is detected at a later time.

7. The apparatus according to claim 6, wherein said power-line networking interface uses HomePlug AV standard.

8. The apparatus according to claim 6, wherein the apparatus is packaged in a compact enclosure which is less than 2 inches by 2½ inches in size and directly plugged into a power outlet.

9. The apparatus according to claim 6, wherein said removable flash memory is configured to be unplugged and plugged into a PC or a TV for viewing said video surveillance data.

10. The apparatus according to claim 6, wherein contents of said removable flash memory are encrypted so that only people with security key is provided access to view said video surveillance data.

11. The apparatus according to claim 6, wherein data is captured and stored with variable bit rate in said circular queue, and is converted to a constant bit rate stream to transmit over a low-bandwidth network channel upon request.

12. The apparatus according to claim 6, wherein said remote device is one of a personal computer, a cell phone, or a monitoring station,

13. The apparatus according to claim 6, wherein the apparatus also performs facial detection and triggers a certain action for a certain list of individuals.

14. The apparatus according to claim 6, wherein an electronic bill of material cost is less than $75.

* * * * *